United States Patent [19]
Vodoklys

[11] 3,816,327
[45] June 11, 1974

[54] STRONTIUM HALOPHOSPHATE PHOSPHOR WHICH INCORPORATES A SMALL AMOUNT OF CALCIUM

[75] Inventor: Frank M. Vodoklys, Wayne, N.J.

[73] Assignee: Westinghouse Electric Corporation, Pittsburgh, Pa.

[22] Filed: Jan. 30, 1970

[21] Appl. No.: 7,076

[52] U.S. Cl. .................................. 252/301.6 P
[51] Int. Cl. .............................. C09k 1/36
[58] Field of Search ............... 252/301.4 P, 301.6 P

[56] References Cited
UNITED STATES PATENTS
2,826,553  3/1958  Butler ..................... 252/301.4 P
3,470,108  9/1969  Ropp ....................... 252/301.4 P Primary Examiner—Oscar R. Vertiz
Assistant Examiner—J. Cooper
Attorney, Agent, or Firm—W. D. Palmer

[57] ABSTRACT

Improved strontium halophosphate phosphor having a preferred composition which emits primarily in the yellow-green region of the visible spectrum. A small amount of the strontium is replaced by calcium to improve the output of the phosphor.

8 Claims, 1 Drawing Figure

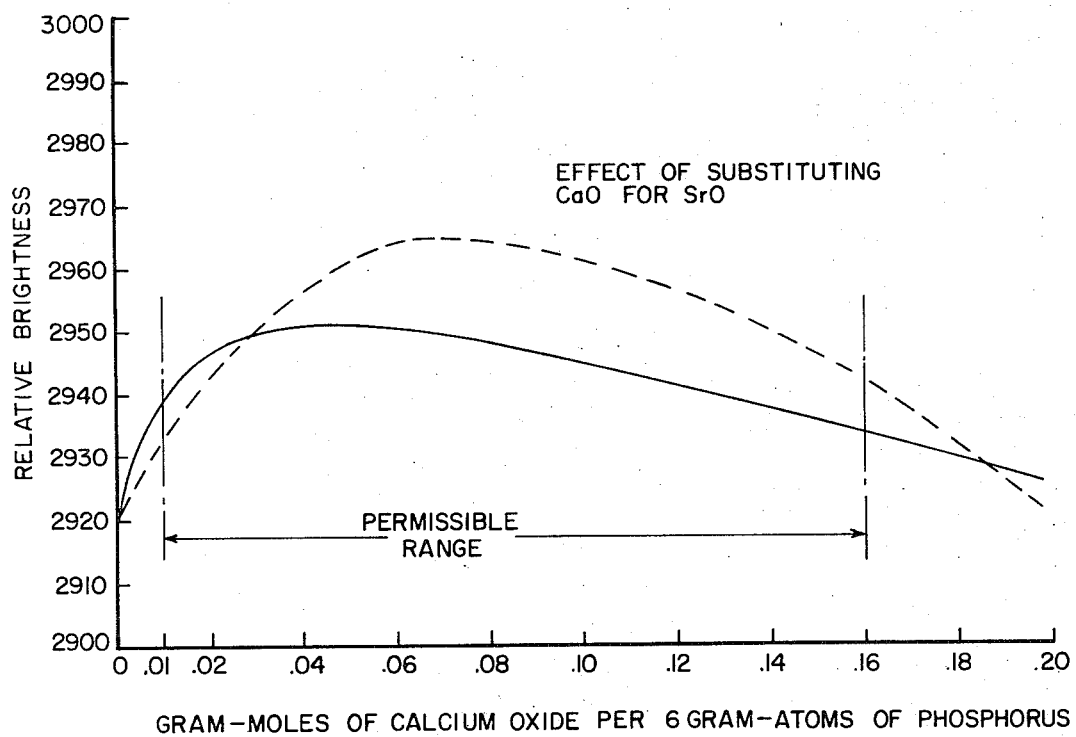

STRONTIUM HALOPHOSPHATE PHOSPHOR WHICH INCORPORATES A SMALL AMOUNT OF CALCIUM

BACKGROUND OF THE INVENTION

This invention relates primarily to the phosphor materials such as are used in fluorescent lamps and, more particularly, to an improved strontium halophosphate phosphor having good output characteristics and which can be specially compounded to have a good output in the yellow-green region of the visible spectrum.

Halophosphate phosphors are now the primary constituent for fluorescent materials as used in fluorescent lamps. Such phosphors are generally described in U.S. Pat. No. 2,488,733, dated Nov. 22, 1949, and normally have a calcium phosphate-calcium halide matrix which is activated either by antimony or by antimony plus manganese, with the emission from the phosphor depending upon the relative proportions of the activator materials. Strontium halophosphate phosphors are also known in the art, as described in U.S. Pat. No. 2,978,626, dated Jan. 17, 1961 and U.S. Pat. No. 3,470,108 dated Sept. 30, 1969. Such phosphors are used less extensively than the calcium species since the output of the strontium halophosphate phosphors is normally not as good as the calcium-halophosphate phosphors. In the practices of the prior art, a so-called deluxe warm white fluorescent lamp has incorporated a blend of tin-activated strontium magnesium phosphate phosphor and strontium halophosphate (fluorochlorophosphate) activated by antimony and manganese. This latter phosphor has a generally yellow-green emission, and the output of this yellow-green emitting halophosphate phosphor is not as good as desired.

SUMMARY OF THE INVENTION

In accordance with the present invention, there is provided a phosphor having the general formulation (a) $M_3(PO_4)_2 \cdot$ (b) $MCl_2 \cdot$ (c) $MF_2 :$ (d) Mn, (e) Sb, wherein M is Sr + Ca + Cd, Sr is present in the gram-atom amount of about 8.82 to 9.84 per 6 gram-atoms of phosphorus, Ca is present in the gram-atom amount of from 0.01 to 0.16 per 6 gram-atoms of phosphorus, Cd is present in the gram-atom amount of from 0.05 to 0.12 per 6 gram-atoms of phosphorus, the ratio of gram-atoms of total metal (expressed as $3a + b + c + d + e$) to gram-atoms of phosphorus in said phosphor is from 9.60:6 to 9.96:6, (b) is from 0.05 to 0.12, (c) is from 0.88 to 0.92, (d) is from 0.02 to 0.40, and (e) is from 0.04 to 0.10.

BRIEF DESCRIPTION OF THE DRAWING

In the sole FIGURE of the drawing, relative brightness for a fluorescent lamp incorporating the present phosphor is plotted versus gram-atoms of calcium oxide per 6 gram-atoms of phosphorus in the phosphor, illustrating the improvement which is obtained by replacing a small amount of the strontium with an equal gram-atom amount of calcium.

DESCRIPTION OF THE PREFERRED EMBODIMENTS

To produce an optimum material having an emission which is primarily in the yellow-green region of the visible spectrum, 555 grams (3.023 gram-atoms) of $SrHPO_4$ is mixed with 166 grams (1.124 gram-atoms) of strontium carbonate, 59 grams (0.470 gram-atom) of strontium fluoride, 27 gram (0.170 gram-atom) strontium chloride, 23 grams (0.079 gram-atom) $Sb_2O_3$, 12 grams (0.104 gram-atom) $MnCO_3$, 11 grams (0.064 gram-atom) $CdCO_3$, and 3 grams (0.030 gram-atom) of $CaCO_3$. These constituents are thoroughly mixed and then fired in a nitrogen atmosphere at a temperature of approximately 1,135°C for approximately 3 hours. The fired phosphor is milled, desirably washed with a dilute solution such as a 0.1 normal solution of nitric acid, water washed, dried and then incorporated into a fluorescent lamp in accordance with the conventional techniques. The phosphor can be incorporated as a constituent of a blend, such as with tin-activated strontium magnesium phosphate phosphor, in the ratio of 45 percent by weight halophosphate and 55 percent by weight strontium magnesium phosphate phosphor.

Referring to the sole FIGURE of the drawing the brightness in relative units of a lamp which incorporates the present phosphor is plotted vs. the gram-mols of calcium oxide, which are substituted for an equivalent gram-molecular amount of strontium oxide in the phosphor raw mix, per 6 gram-atoms of phosphorus in the raw mix. As shown, the effect of the calcium oxide substitution on brightness is not appreciable until approximately 0.01 gram-mol of calcium oxide is present per 6 gram-atoms of phosphorus, and if more than 0.16 gram mol of calcium oxide is present per 6 gram-atoms of phosphorus, the improved effect again becomes limited. The preferred calcium oxide substitution is from 0.02 to 0.10 gram-atom of calcium per 6 gram-atoms of phosphorus in the raw mix. While the calcium is normally added to the raw-mix as the carbonate, it has been expressed in the sole FIGURE as the equivalent amount of calcium oxide to which the carbonate decomposes on firing.

The state of division of the calcium carbonate, as added to the raw-mix, has an influence on the output of the fired phosphor. If the usual commercially available phosphor-grade calcium carbonate, which has an average particle size of about 16 microns, for example, (as measured by a Coulter Counter) is used in preparing the phosphor, the output of the lamp which incorporates the prepared phosphor varies in accordance with the solid curve shown in the FIGURE. If the calcium carbonate is milled to an average particle size of 5 microns or less before mixing with the other raw-mix constituents, the output of the lamp incorporating the prepared phosphor varies in accordance with the dashed curve shown in the FIGURE.

In the following Table A are set forth raw-mix constituents, together with permissible ranges for each constituent, in order to provide an improved strontium halophosphate phosphor which incorporates a small amount of calcium. A fluoroscent lamp coated with the phosphor has an emission color which varies between the ICI coordinates $x = 0.260$, $y = 0.340$ to $x = 0.410$ $y = 0.435$, depending primarily upon the activator constituents. While each of the raw-mix constituents are designated as the oxides in Table A, except for the halogen constituent, as is fairly customary in the art, it should be understood that the strontium will normally be added as the acid phosphate, carbonate, fluoride and the chloride, the antimony can be added as the oxide, the manganese as the carbonate and the cadmium and the calcium as the carbonates, as in the previous example.

TABLE A

| Constituent | Gram Moles (Gram-Atoms) |
| --- | --- |
| SrO | 8.82–9.84 |
| $P_2O_5$ | 3.00 |
| Cl | 0.30–0.80 |
| F | 1.50–2.00 |
| $Sb_2O_3$ | 0.06–0.50 |
| MnO | 0.02–0.40 |
| CdO | 0.06–0.24 |
| CaO | 0.01–0.16 |

The foregoing raw mix is fired and thereafter processed as in the previous example, and during this firing, some of the chlorine, fluorine, antimony and cadmium will be volatilized.

The foregoing phosphor raw mix, after firing, will provide a phosphor having the general formula (a) $M_3(PO_4)_2 \cdot$ (b) MClhd 2 $\cdot$ (c) $MF_2$: (d) Mn, (e) Sb, wherein M is Sr + Ca + Cd, strontium is present in the gram-atom amount of from 8.82 to 9.84 per 6 gram-atoms of phosphorus, calcium is present in the gram-atom amount of from 0.01 to 0.16 per 6 gram-atoms of phosphorus, and cadmium is present in the gram-atom amount of from 0.05 to 0.12 per 6 gram-atoms of phosphorus. The ratio of gram atoms of total metal, which is expressed as $3a + b + c + d + e$, to gram-atoms of phosphorus in the phosphor is from 9.60:6 to 9.96:6. The value of (b) is from 0.05 to 0.12, due to some of the chlorine being lost during firing. The value of (c) is from 0.88 to 0.92 due to some of the fluorine being lost during firing. The value of (d) is from 0.02 to 0.40 and the value of (e) is from 0.04 to 0.10 due to some of the antimony being lost during firing. The foregoing phosphor can also be described by the following alternative general formula:

$$Sr_{(t)}Ca_{(u)}Cd_{(v)}Cl_{(w)}F_{(x)}(PO_4)_{6:00}:Mn_{(y)},Sb_{(z)},$$

wherein
(t) is from 8.82 to 9.84,
(u) is from 0.01 to 0.16,
(v) is from 0.05 to 0.12,
(t + u + v + y + z) is from 9.60 to 9.96,
(w) is from 0.10 to 0.24,
(x) is from 1.76 to 1.84,
(y) is from 0.02 to 0.40, and
(z) is from 0.04 to 0.10.

If it is desired to provide the phosphor with an emission which occurs primarily in the yellow-green region of the visible spectrum, the phosphor raw mix is prepared to provide constituents in accordance with the relative amounts as specified in Table B hereinafter, with the phosphor constituents, except for the halogens, represented as the oxides. Of course, the phosphor raw mix normally would be compounded with raw materials as used in preparing the preferred raw mix formulation, as given hereinbefore.

TABLE B

| Constituent | Gram Moles (Gram-Atoms) |
| --- | --- |
| SrO | 8.98–9.68 |
| $P_2O_5$ | 3.00 |
| Cl | 0.30–0.80 |
| F | 1.50–2.00 |
| $Sb_2O_3$ | 0.06–0.50 |
| MnO | 0.18–0.24 |
| CdO | 0.06–0.24 |
| CaO | 0.01–0.16 |

The foregoing raw mix is fired as in the previous example and a lamp incorporating the phosphor will have an emission color which can vary from $x = 0.359$, $y = 0.413$ to $x = 0.385$, $y = 0.429$, depending upon the relative activator concentrations. The general formulation of the fired phosphor will be as specified in the previous example, except that strontium will be present in the phosphor in gram-atom amount of from 8.98 to 9.68 per 6 gram-atoms of phosphorus, and the manganese content (d) will vary from 0.18 to 0.24, as expressed in the previous formulation.

In the alternative phosphor formulation as set forth after Table A, the following modified values will be present for a phosphor prepared from a raw-mix as specified under Table B: (t) which is the strontium content will vary from 8.98 to 9.68, and (y) which is the manganese content will vary from 0.18 to 0.24.

In the following Table C are set forth preferred raw-mix constituent ranges for producing an optimum yellow-green emitting phosphor. The color of the fluorescent lamp which incorporates the finished phosphor is substantially identical to the color of the lamp prepared in accordance with the raw mix constituents set forth in Table B. After the raw mix constituents are thoroughly mixed, the firing and supplemental processing is the same as disclosed in the previous examples.

TABLE C

| Constituent | Gram Moles (Gram-Atoms) |
| --- | --- |
| SrO | 9.34–9.63 |
| $P_2O_5$ | 3.00 |
| Cl | 0.36–0.70 |
| F | 1.80–1.96 |
| $Sb_2O_3$ | 0.12–0.16 |
| MnO | 0.18–0.24 |
| CdO | 0.10–0.14 |
| CaO | 0.02–0.12 |

The resulting prepared phosphor will have the same general formulation as the phosphor prepared in accordance with the raw mix set forth under Table A, except that strontium will be present in the gram-atom amount of from 9.34 to 9.63 gram-atoms per 6 gram-atoms of phosphorus, cadmium will be present in the gram-atom amount of from 0.09 to 0.12 per 6 gram-atoms of phosphorus, the ratio of gram-atoms of total metal to gram-atoms of phosphorus will be from 9.90:6 to 9.96:6, calcium will be present in the gram-atom amount of from 0.02 to 0.12 per gram-atoms of phosphorus, the value of (b) will be from 0.06 to 0.10, the value of (c) will be from 0.90 to 0.92, the value of (d) will be from 0.18 to 0.24, and the value of (e) will be from 0.04 to 0.08.

In the alternative phosphor formulation as set forth after Table A, the following values will be present for a phosphor prepared from the raw mix as specified in Table C:
(t) gram atoms of Sr is from 9.34 to 9.63,
(u) gram atoms of Ca is from 0.02 to 0.10,
(v) gram atoms of Cd is from 0.09 to 0.12,
(t + u + v + y + z) gram atoms of total metal is from 9.90 to 9.96,
(w) gram atoms of Cl is from 0.12 to 0.20,
(x) gram atoms of F is from 1.80 to 1.84, (y) gram atoms of Mn is from 0.18 to 0.24, and
(z) gram atoms of Sb is from 0.04 to 0.08.

I claim as my invention:

1. An improved strontium halophosphate phosphor composition having the general formulation: (a)M$_3$(PO$_4$)$_2$·(b)MCl$_2$·(c)MF$_2$:(d)Mn, (e)Sb, wherein M is Sr + Ca + Cd, Sr is present in the gram-atom amount of from 8.82 to 9.84 per 6 gram-atoms of phosphorus, Ca is present in the gram-atom amount of from 0.01 to 0.16 per 6 gram-atoms of phosphorus, Cd is present in the gram-atom amount of from 0.05 to 0.12 per 6 gram-atoms of phosphorus, the ratio of gram-atoms of total metal (expressed as $3a + b + c + d + e$) to gram-atoms of phosphorus in said phosphor is from 9.60:6 to 9.96:6, (b) is from 0.05 to 0.12, (c) is from 0.88 to 0.92, (d) is from 0.02 to 0.40, and (e) is from 0.04 to 0.10.

2. The phosphor as specified in claim 1, wherein said phosphor emits primarily the yellow-green region of the spectrum, Sr is present in the gram-atom amount of from 8.98 to 9.68 per 6 gram atoms of phosphorus, and (d) is from 0.18 to 0.24.

3. The phosphor as specified in claim 1, wherein said phosphor emits primarily in the yellow-green region of the spectrum, Sr is present in the gram-atom amount of from 9.34 to 9.63 per 6 gram-atoms of phosphorus, Ca is present in the gram-atom amount of from 0.02 to 0.10 per 6 gram-atoms of phosphorus, Cd is present in the gram-atom amount of from 0.09 to 0.12 per 6 gram-atoms of phosphorus, the ratio of gram-atoms of total metal to gram-atoms of phosphorus in said phosphor is from 9.90:6 to 9.96:6, (b) is from 0.06 to 0.10, (d) is from 0.18 to 0.24, and (e) is from 0.04 to 0.08.

4. The phosphor as specified in claim 3, wherein calcium is added to the phosphor raw-mix as the carbonate in amount of from 0.02 to 0.10 gram-atom per 6 gram-atoms of phosphorus in the raw mix, and the average particle size of said calcium carbonate does not exceed about 5 microns.

5. An improved strontium halophosphate phosphor composition having the general formulation:

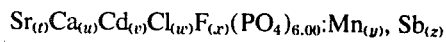

wherein:
(t) is from 8.82 to 9.84,
(u) is from 0.01 to 0.16,
(v) is from 0.05 to 0.12,
(t + u + v + y + z) is from 9.60 to 9.96,
(w) is from 0.10 to 0.24,
(x) is from 1.76 to 1.84,
(y) is from 0.02 to 0.40, and
(z) is from 0.04 to 0.10.

6. The phosphor as specified in claim 5, wherein said phosphor emits primarily in the yellow-green region of the spectrum, (t) is from 8.98 to 9.68, and (y) is from 0.18 to 0.24.

7. The phosphor as specified in claim 5, wherein said phosphor emits primarily in the yellow region of the spectrum, and wherein:
(t) is from 9.34 to 9.63,
(u) is from 0.02 to 0.10,
(v) is from 0.09 to 0.12,
(t + u + v + y + z) is from 9.90 to 9.96,
(w) is from 0.12 to 0.20,
(x) is from 1.80 to 1.84,
(y) is from 0.18 to 0.24, and
(z) is from 0.04 to 0.08.

8. The phosphor as specified in claim 7, wherein calcium is added to the phosphor raw-mix as the carbonate in amount of from 0.02 to 0.10 gram-atom per 6 gram-atoms of phosphorus in the raw-mix, and the particle size of said calcium carbonate does not exceed 5 microns.

* * * * *